(12) United States Patent  
Kamada (10) Patent No.: US 7,942,771 B2
(45) Date of Patent: May 17, 2011

(54) BICYCLE SPROCKET APPARATUS WITH A SHIFT INHIBITING STRUCTURE

(75) Inventor: Kenji Kamada, Abeno (JP)

(73) Assignee: Shimano, Inc., Sakai-ku, Sakai City (JP)

( * ) Notice: Subject to any disclaimer, the term of this patent is extended or adjusted under 35 U.S.C. 154(b) by 781 days.

(21) Appl. No.: 11/164,993

(22) Filed: Dec. 13, 2005

(65) Prior Publication Data

US 2007/0135250 A1   Jun. 14, 2007

(51) Int. Cl.
*F16H 55/30* (2006.01)
*F16H 55/12* (2006.01)

(52) U.S. Cl. ........ 474/160; 474/152; 474/153; 474/154; 474/155; 474/158

(58) Field of Classification Search ................. 474/160, 474/152
See application file for complete search history.

(56) References Cited

U.S. PATENT DOCUMENTS

| | | | | |
|---|---|---|---|---|
| 4,889,521 | A | | 12/1989 | Nagano .......................... 474/164 |
| 5,192,249 | A | * | 3/1993 | Nagano .......................... 474/160 |
| 5,545,096 | A | | 8/1996 | Su |
| 5,876,159 | A | * | 3/1999 | Tseng et al. .................... 409/51 |
| 6,045,472 | A | | 4/2000 | Sung et al. |
| 6,340,338 | B1 | * | 1/2002 | Kamada ......................... 474/160 |
| 2004/0043855 | A1 | * | 3/2004 | Wei ................................ 474/160 |
| 2005/0079940 | A1 | * | 4/2005 | Reiter ............................ 474/160 |

FOREIGN PATENT DOCUMENTS

| | | |
|---|---|---|
| EP | 444645 A1 | 9/1991 |
| EP | 1413508 A2 | 4/2004 |
| EP | 1522490 A2 | 4/2005 |

OTHER PUBLICATIONS

European search report for EP 06023275.8, the European application that corresponds to this application, dated Dec. 6, 2007.

* cited by examiner

*Primary Examiner* — Robert Siconolfi
*Assistant Examiner* — San Aung
(74) *Attorney, Agent, or Firm* — James A. Deland (57) ABSTRACT

A bicycle sprocket apparatus comprises a larger diameter sprocket and a smaller diameter sprocket, wherein the larger diameter sprocket has on its outer periphery a plurality of sprocket teeth, the smaller diameter sprocket has on its outer periphery a plurality of sprocket teeth, and a number of sprocket teeth on the smaller diameter sprocket is less than a number of sprocket teeth on the larger diameter sprocket. The larger diameter sprocket includes a tooth and a first chain receiving tooth disposed immediately behind the tooth in the driving rotation direction, wherein the tooth includes a control side surface and an inclined side surface. The control side surface is disposed on a leading side of the tooth facing the smaller diameter sprocket in the driving rotation direction, and it is shaped to inhibit movement of the chain towards the larger diameter sprocket so that the chain does not engage the first chain receiving tooth when the chain is shifted from the smaller diameter sprocket to the larger diameter sprocket. The first inclined side surface faces the smaller diameter sprocket, and it is inclined relative to a plane of the sprocket to follow a direction of movement of the chain when the chain is shifted from the smaller diameter sprocket to the larger diameter sprocket.

12 Claims, 5 Drawing Sheets

BICYCLE SPROCKET APPARATUS WITH A SHIFT INHIBITING STRUCTURE

BACKGROUND OF THE INVENTION

The present invention is directed to bicycles and, more particularly, to a bicycle sprocket apparatus that controls shifting of a chain from a smaller diameter sprocket to a larger diameter sprocket.

U.S. Pat. No. 4,889,521 discloses a multistage sprocket apparatus that includes at least one larger diameter sprocket and at least one smaller diameter sprocket assembled in a relationship such that the center point between a pair of adjacent teeth at the larger diameter sprocket and the center point between a pair of adjacent teeth at the smaller diameter sprocket are positioned on a tangent extending along the chain path when the chain is being shifted from the smaller diameter sprocket to the larger diameter sprocket. The distance between the center points is substantially equal to an integer multiple of the chain pitch. A chain guide portion is provided at the inside surface of the larger diameter sprocket at a position corresponding to the path of the chain when the chain travels between the center points for allowing the chain to move axially of the sprocket apparatus slightly toward the larger diameter sprocket. This facilitates shifting the chain from the smaller diameter sprocket to the larger diameter sprocket. One or more teeth on the larger diameter sprocket may be offset or inclined from a centerline of the sprocket body to further facilitate shifting the chain from the smaller diameter sprocket to the larger diameter sprocket. The system works so well that the chain usually firmly engages the teeth on the larger diameter sprocket even under severe pedaling pressure. However, engagement of the chain with the teeth of the larger diameter sprocket under such conditions may cause undesirable stresses on the chain and jolting to the rider.

SUMMARY OF THE INVENTION

The present invention is directed to various features of a rear sprocket for a bicycle. In one embodiment, a bicycle sprocket apparatus is provided for use with a chain having pairs of inner link plates alternatingly connected to pairs of outer link plates through a roller assembly including a roller. The apparatus comprises a larger diameter sprocket and a smaller diameter sprocket, wherein the larger diameter sprocket has on its outer periphery a plurality of sprocket teeth, the smaller diameter sprocket has on its outer periphery a plurality of sprocket teeth, and a number of sprocket teeth on the smaller diameter sprocket is less than a number of sprocket teeth on the larger diameter sprocket. The larger diameter sprocket includes a tooth and a first chain receiving tooth disposed immediately behind the tooth in the driving rotation direction, wherein the tooth includes a control side surface and an inclined side surface. The control side surface is disposed on a leading side of the tooth facing the smaller diameter sprocket in the driving rotation direction, and it is shaped to inhibit movement of the chain towards the larger diameter sprocket so that the chain does not engage the first chain receiving tooth when the chain is shifted from the smaller diameter sprocket to the larger diameter sprocket. The first inclined side surface faces the smaller diameter sprocket, and it is inclined relative to a plane of the sprocket to follow a direction of movement of the chain when the chain is shifted from the smaller diameter sprocket to the larger diameter sprocket.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
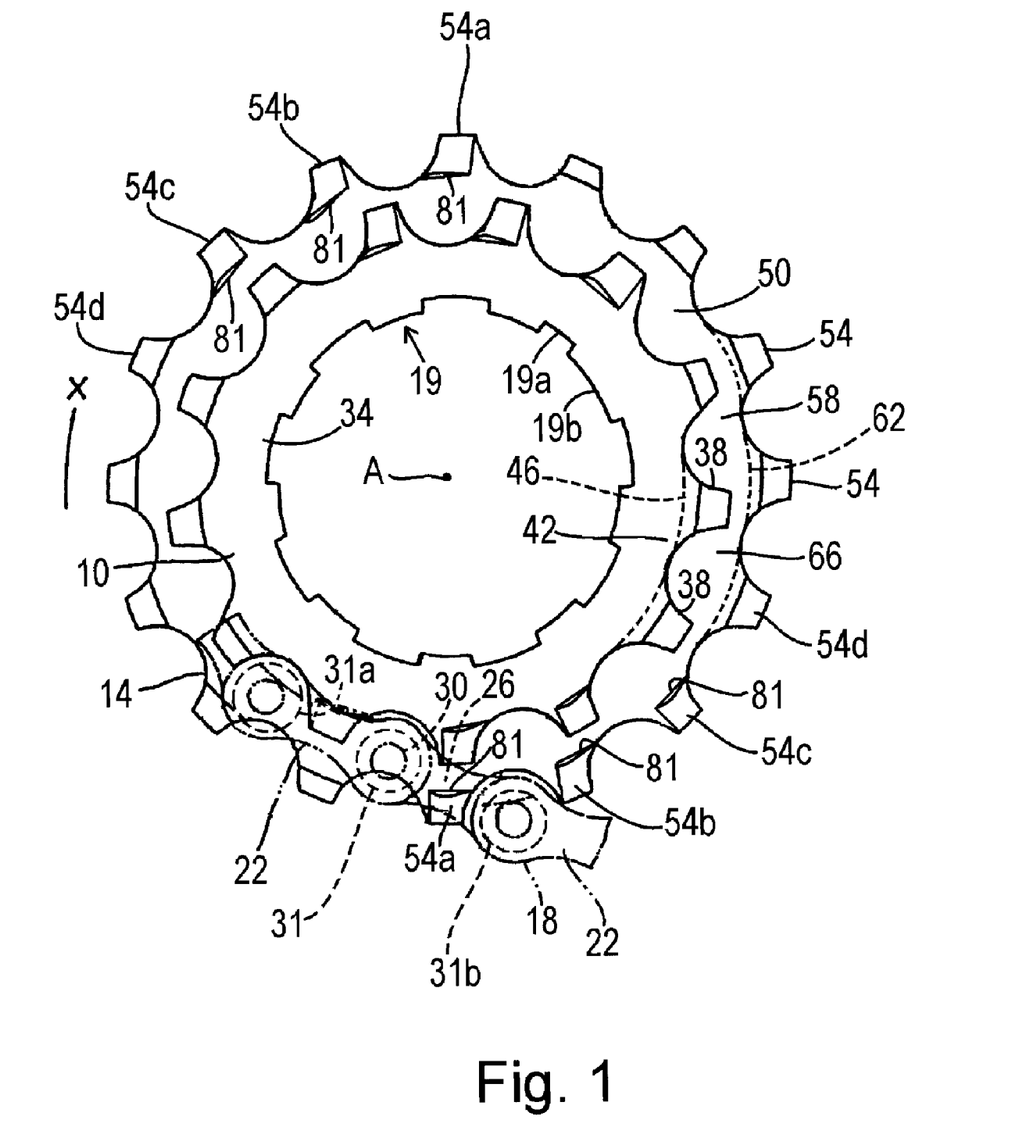
FIG. 1 is a side view of a particular embodiment of first and second sprockets.

FIG. 1 is a side view of a particular embodiment of a smaller diameter first sprocket 10 and a larger diameter second sprocket 14. Sprockets 10 and 14 typically form part of a multiple sprocket assembly wherein a plurality of, e.g., two through nine sprockets are coaxially mounted together and axially spaced apart from each other by a predetermined distance for rotation around a common axis A such as that defined by a rear wheel hub axle. When mounted for rotation around a wheel hub axle, sprockets 10 and 14 typically are mounted around a tubular sprocket-mounting sleeve (not shown) though a plurality of splines 19 that engage a corresponding plurality of splines on the sprocket mounting sleeve in a known manner. A radially outwardly extending spline 19a and a radially inwardly extending spline 19b on each sprocket usually has a different shape from the remaining splines 19 to fix each of the plurality of sprockets at a predetermined rotational position relative to its adjacent sprocket(s). The sprocket mounting sleeve is, in turn, rotatably mounted around the hub axle through a plurality of ball bearings and a one-way clutch in a known manner.

Small diameter sprocket 10 comprises a sprocket body 34 and a plurality of sprocket teeth 38 extending radially outwardly from a root portion 42 of sprocket body 34. Root portion 42 extends radially inwardly from a root circle 46 of sprocket body 34. As is well known, a root circle is a hypothetical circle defined by the bottom of the tooth spaces of a sprocket.

Similarly, larger diameter sprocket 14 comprises a sprocket body 50 and a plurality of sprocket teeth 54 extending radially outwardly from a root portion 58 of sprocket body 50. Root portion 58 extends radially inwardly from a root circle 62 of sprocket body 50. In this embodiment, sprocket body 50 has a first side surface 66 and a second side surface 70 (FIG. 3), wherein a root portion side surface 66a of first side surface 66 at root portion 58 defines a root portion or sprocket plane P.

Chain 18 has a typical construction wherein pairs of outer link plates 22 alternate with pairs of inner link plates 26, and each pair of link plates is connected to the adjacent pair of link plates through a connecting pin 30, and each connecting pin 30 rotatably supports a roller 31.

In this embodiment, a tooth 54a is disposed immediately ahead of each second roller receiving space 78 in a driving rotation direction X, a first chain receiving tooth 54b is disposed immediately behind each second roller receiving space 78 in the driving rotation direction X, a second chain receiving tooth 54c is disposed immediately behind each first chain receiving tooth 54b in the driving rotation direction X, and a third chain receiving tooth 54d is disposed immediately behind each second chain receiving tooth 54c in the driving rotation direction X. In general, tooth 54a is shaped to inhibit movement of chain 18 towards larger diameter sprocket 14 so that chain 18 does not engage first chain receiving tooth 54b when chain 18 is shifted from smaller diameter sprocket 10 to larger diameter sprocket 14.

Figure 3:
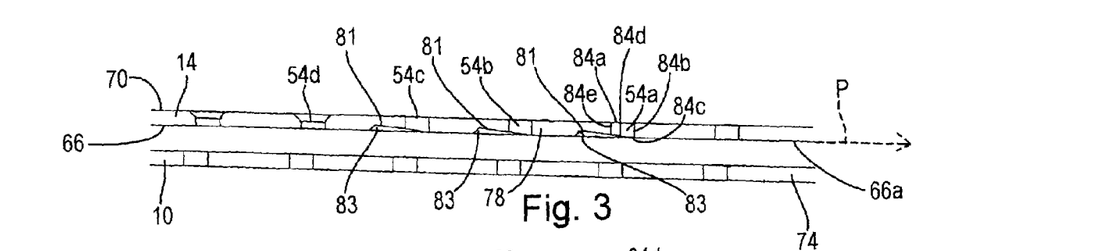
FIG. 3 is a top view of the first and second sprockets.

In this embodiment, a lateral recess 81 is disposed below tooth 54a, first chain receiving tooth 54b and second chain receiving tooth 54c. As shown in FIG. 3, each recess 81 enlarges laterally toward second side surface 70 in a direction opposite the drive rotation direction X to form a floor 83. Recess 81 allows chain 18 to move closer to second side surface 70 than otherwise would be the case if recess 81 were absent, and floor 83 is shaped to support a bottom edge of a link plate of chain 18.

Figure 2:
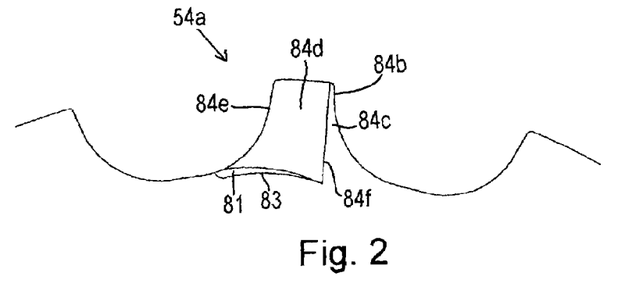
FIG. 2 is a side view of a particular embodiment of a sprocket tooth with a shift control structure.

In this embodiment, tooth 54a, first chain receiving tooth 54b and second chain receiving tooth 54c have the same shape, so only tooth 54a will be described in detail. As shown in FIGS. 2 and 3, tooth 54a includes side surfaces 84a, 84b, 84c, 84d and 84e with the appropriate radial inclination. Side surface 84a is substantially parallel to plane P in plan view and may comprise simply a radially outwardly extending portion of second side surface 70. Side surfaces 84b and 84e are substantially perpendicular to plane P and to side surface 84a. Side surface 84b extends to first side surface 66 of larger diameter sprocket 14, but side surface 84e is shorter than side surface 84b and does not extend to first side surface 66. Control side surface 84c is substantially parallel to plane P and may comprise simply a radially outwardly extending portion of first side surface 66. Inclined side surface 84d is a trailing side surface that extends at an incline toward second side surface 70 from a transition edge 84f at control side surface 84c to side surface 84e. In this embodiment, inclined side surface 84d is configured to follow a direction of movement of chain 18 when chain 18 is shifted from smaller diameter sprocket 10 to larger diameter sprocket 14 in order to guide chain 18 from smaller diameter sprocket 10 to larger diameter sprocket 14. However, unlike the recesses in the prior art, control side surface 84c is shaped to control movement of chain 18 towards larger diameter sprocket 14 so that chain 18 does not engage first chain receiving tooth 54b when chain 18 is shifted from smaller diameter sprocket 10 to larger diameter sprocket 14.

Figure 4:
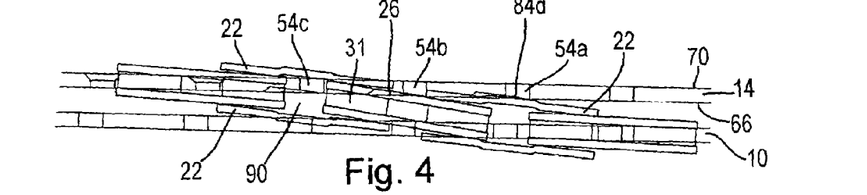
FIG. 4 is a top view illustrating shifting of a bicycle chain from the first sprocket to the second sprocket when a tooth is aligned with an outer link plate of a bicycle chain.

FIG. 4 is a top view illustrating shifting of chain 18 from smaller diameter sprocket 10 to larger diameter sprocket 14 when tooth 54a is aligned with an outer link plate 22 of chain 18. In this case, tooth 54a, and particularly inclined side surface 84d, is dimensioned to engage a laterally outer surface of an outer link plate 22 of chain 18 as chain 18 shifts from smaller diameter sprocket 10 to larger diameter sprocket 14; first chain receiving tooth 54b is dimensioned to engage a laterally outer surface of an inner link plate 26 of chain 18 immediately behind outer link plate 22 in the driving rotation direction; and second chain receiving tooth 54c is dimensioned to engage a space 90 between a pair of outer link plates 22 of chain 18 immediately behind inner link plate 26 in the driving rotation direction.

Figure 5:
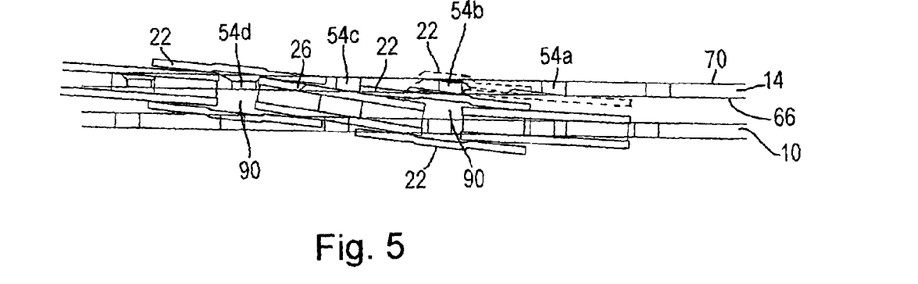
FIG. 5 is a top view illustrating shifting of a bicycle chain from the first sprocket to the second sprocket when the tooth is aligned with an inner link plate of the bicycle chain.

FIG. 5 is a top view illustrating shifting of chain 18 from smaller diameter sprocket 10 to larger diameter sprocket 14 when tooth 54a is aligned with an inner link plate 26 of chain 18. Unlike prior art structures that are designed so that an outer link plate 22 of chain 18 is captured by first chain receiving tooth 54b, first chain receiving tooth 54b is dimensioned to resist engagement with the space 90 between the pair of outer link plates 22. As shown in phantom lines, when shifting from smaller diameter sprocket 10 to larger diameter sprocket 14, an outer link plate 22 initially rides on first chain receiving tooth 54b, but first chain receiving tooth 54b fails to engage the space between the pair of outer link plates 22. After first chain receiving tooth 54b fails to engage the space between the pair of outer link plates 22, first chain receiving tooth 54b engages a laterally outer surface of an outer link plate 22 of chain 18 as chain shifts from smaller diameter sprocket 10 to larger diameter sprocket 14, second chain receiving tooth 54c engages a laterally outer surface of an inner link plate 26 of chain 18 immediately behind outer link plate 22 in the driving rotation direction X, and third chain receiving tooth 54d is dimensioned to engage a space 90 between a pair of outer link plates 22 of chain 18 immediately behind inner link plate 22 in the driving rotation direction X. In this embodiment, third chain receiving tooth 54d has a conventional tooth structure but is laterally offset toward first side surface 66 of larger diameter sprocket 14 to more easily engage the space 90 between the corresponding outer link plates 22.

Thus, unlike prior art designs, chain 18 does not engage first chain receiving tooth 54b as chain 18 shifts from smaller diameter sprocket 10 to larger diameter sprocket 14. This arrangement lessens the shock on chain 18 and the corresponding shock on the rider. On the other hand, the side surfaces 84d of teeth 54a-54c are inclined to follow a direction of movement of chain 18 when chain 18 is shifted from smaller diameter sprocket 10 to larger diameter sprocket 14, so these surfaces still perform a smooth and predictable chain guiding function.

Figure 6A:
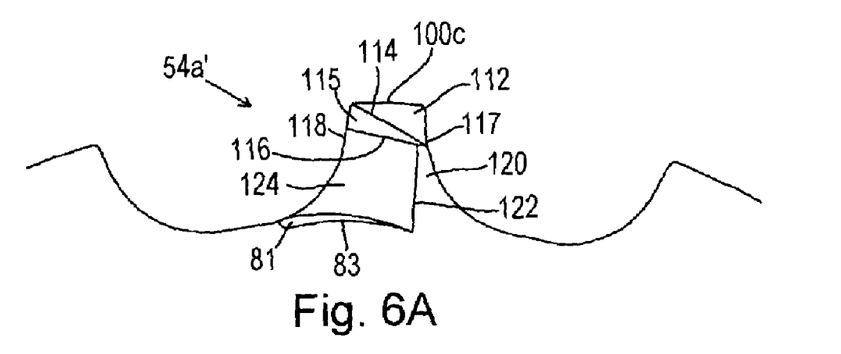
FIG. 6A is a side view of another embodiment of a sprocket tooth with a shift control structure.
Figure 6B:
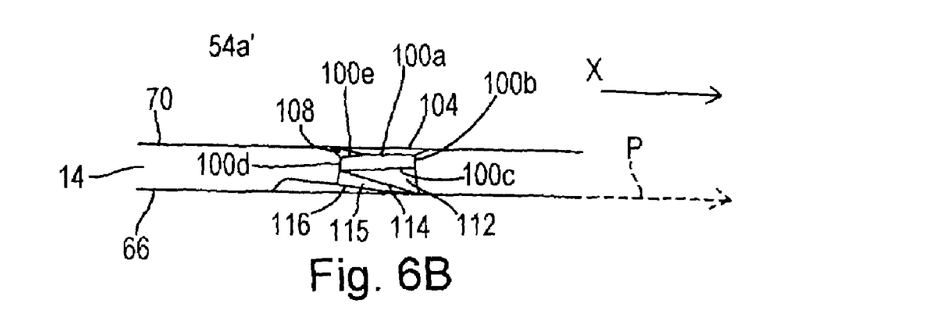
FIG. 6B is a top view of the sprocket tooth shown in FIG. 6A.

FIG. 6A is a side view of another embodiment of a tooth 54a', and FIG. 6B is a top view of tooth 54a'. In this embodiment, tooth 54a' includes top edges 100a, 100b, 100c, 100d and 100e. Top edge 100a is substantially parallel to top edge 100c, and both top edges 100a and 100c incline away from plane P in the drive rotation direction X, but top edge 100a is shorter than top edge 100c. Top edges 100b and 100d are substantially parallel to each other, and top edge 100b extends from top edge 100a to 100c. Top edge 100d extends from top edge 100c and terminates at top edge 100e. Top edge 100e inclines away from plane P in the drive rotation direction X from top surface 100d to top surface 100a. As a result of this structure, a beveled side surface 104 extends from top edge 100a to second side surface 70 of larger diameter sprocket 14, and a beveled side surface 108 extends from top edge 100e to second side surface 70. A beveled side surface 112 extends from top edge 100c to a transition edge 114, and another beveled side surface 115 extends from transition edge 114 to another transition edge 116. Side surfaces 117 and 118 extend radially inwardly from top surfaces 100b and 100d, respectively. Of course, all of the side surfaces have the appropriate radial inclination. As in the first embodiment, a control side surface 120 is substantially parallel to plane P and may comprise simply a radially outwardly extending portion of first side surface 66 that extends from side surface 117 and transition edge 116 to a transition edge 122. Also, inclined side surface 124 extends at an incline toward second side surface 70 from transition edge 122 to side surface 118, similar to the first embodiment.

Figure 7A:
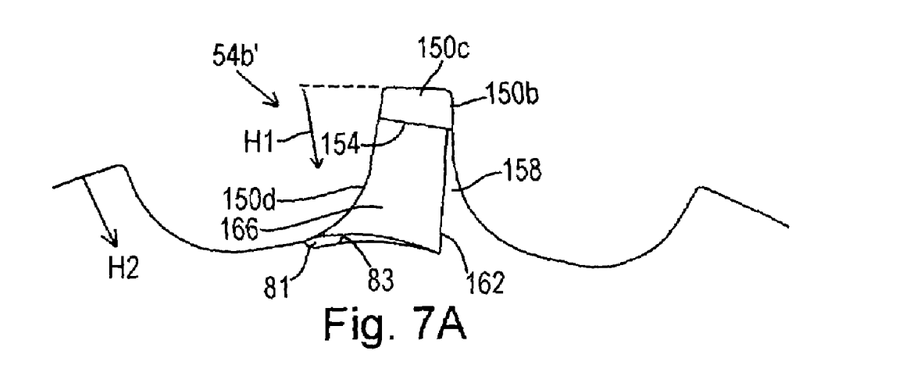
FIG. 7A is a side view of another embodiment of a sprocket tooth with a shift control structure.
Figure 7B:
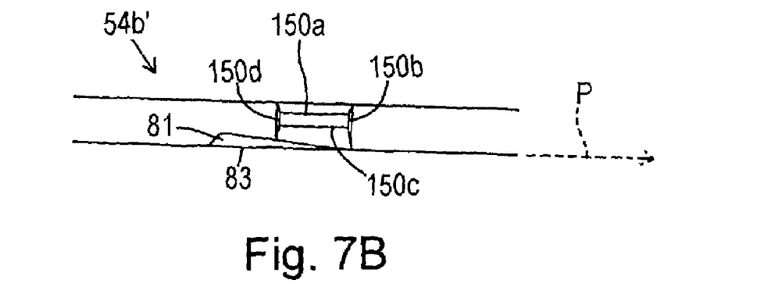
FIG. 7B is a top view of the sprocket tooth shown in FIG. 7A.

FIG. 7A is a side view of another embodiment of a first chain receiving tooth 54b', and FIG. 7B is a top view of first chain receiving tooth 54b'. In this embodiment, a radial height H1 of first chain receiving tooth 54b' (measured from axis A) is greater than a radial height H2 of at least one other sprocket tooth on the larger diameter sprocket, such as tooth 54a or 54a', for example, or any or all other teeth on the sprocket. First chain receiving tooth 54b' includes side surfaces 150a, 150b, 150c and 150d. Side surface 150a is substantially parallel to side surface 150c in plan view, and both side surfaces 150a and 150c are substantially parallel to plane P. Similarly, side surface 150b is substantially parallel to side surface 150d, and both side surfaces 150b and 150d are substantially perpendicular to plane P. Side surfaces 150a, 150b and 150d have an appropriate radial inclination. Side surface 150c extends radially inwardly to a transition edge 154. As in the first embodiment, a side surface 158 is substantially parallel to plane P and may comprise simply a radially outwardly extending portion of first side surface 66. Side surface 158 extends from side surface 150b and transition edge 154 to a transition edge 162. Also, a trailing side surface 166 extends at an incline toward second surface 70 from transition edge 162 to side surface 150d, similar to the first embodiment, but preferably with transition edge 154 as an upper border.

Figure 8A:
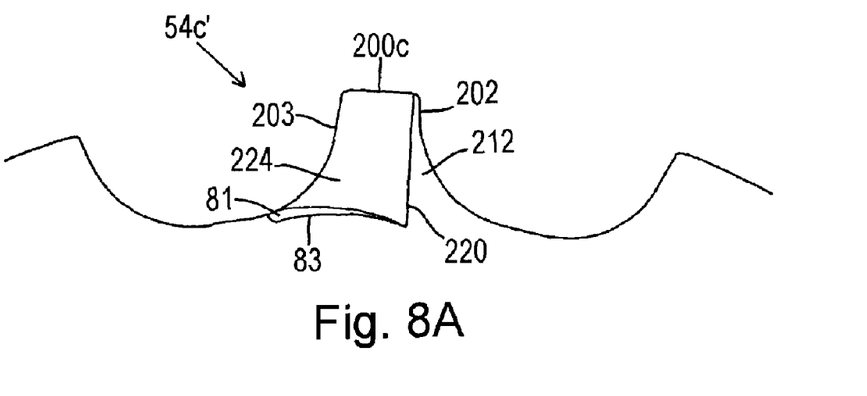
FIG. 8A is a side view of another embodiment of a sprocket tooth with a shift control structure.
Figure 8B:
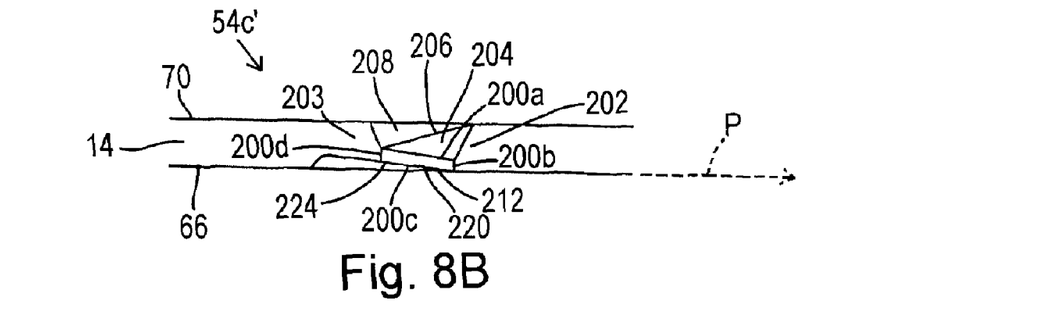
FIG. 8B is a top view of the sprocket tooth shown in FIG. 8A.

FIG. 8A is a side view of another embodiment of a second chain receiving tooth 54c', and FIG. 8B is a top view of second chain receiving tooth 54c'. In this embodiment, second chain receiving tooth 54c' includes top edges 200a, 200b, 200c and 200d. Top edge 200a is substantially parallel to top edge 200c, and top edge 200b is substantially parallel to top edge 200d to form a parallelogram. Both top edges 200a and 200c incline toward plane P in the drive rotation direction X. A beveled side surface 204 extends from top edge 200a to a transition edge 206, and a beveled side surface 208 extends from transition edge 206 to second side surface 70. Side surfaces 202 and 203 extend radially inwardly from top surfaces 200b and 200d, respectively with the appropriate radial incline. As in the first embodiment, a side surface 212 is substantially parallel to plane P and may comprise simply a radially outwardly extending portion of first side surface 66 that extends from side surface 200b to a transition edge 220. Also, a trailing side surface 224 extends at an incline toward second surface 70 from transition edge 220 to side surface 203, similar to the first embodiment.

Figure 9A:
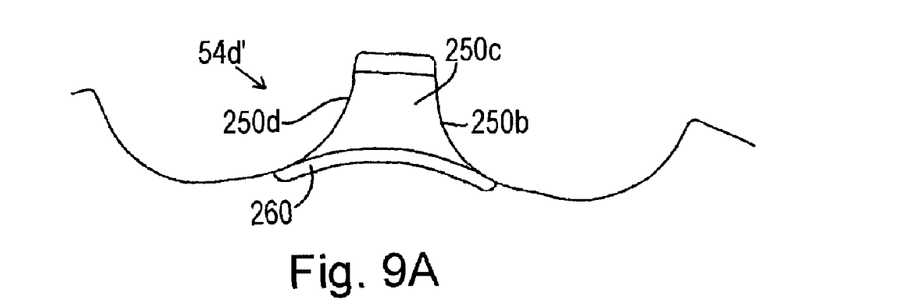
FIG. 9A is a side view of another embodiment of a sprocket tooth with a shift control structure.
Figure 9B:
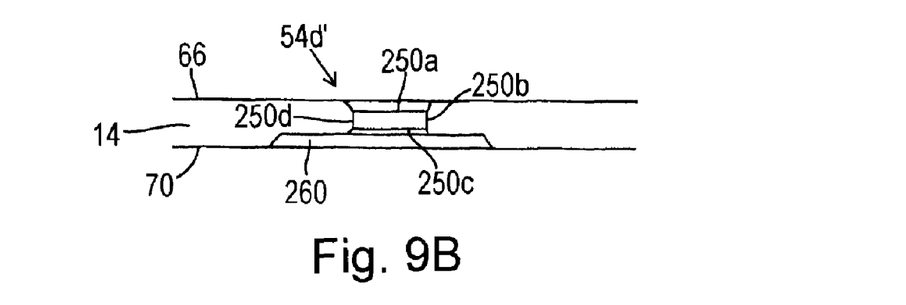
FIG. 9B is a top view of the sprocket tooth shown in FIG. 9A.

FIG. 9A is a side view of another embodiment of a third chain receiving tooth 54d', and FIG. 9B is a top view of third chain receiving tooth 54d'. Third chain receiving tooth 54d' includes side surfaces 250a, 250b, 250c and 250d. Side surface 250a is substantially parallel to side surface 250c in plan view, and both side surfaces 250a and 250c are substantially parallel to plane P. Similarly, side surface 250b is substantially parallel to side surface 250d, and both side surfaces 250b and 250d are substantially perpendicular to plane P. In this embodiment, an arcuate recess 260 is formed below third chain receiving tooth 54d' on second side surface 70 to better receive an intermediate inner side portion of an outer link plate 22 of chain 18.

Figure 10:
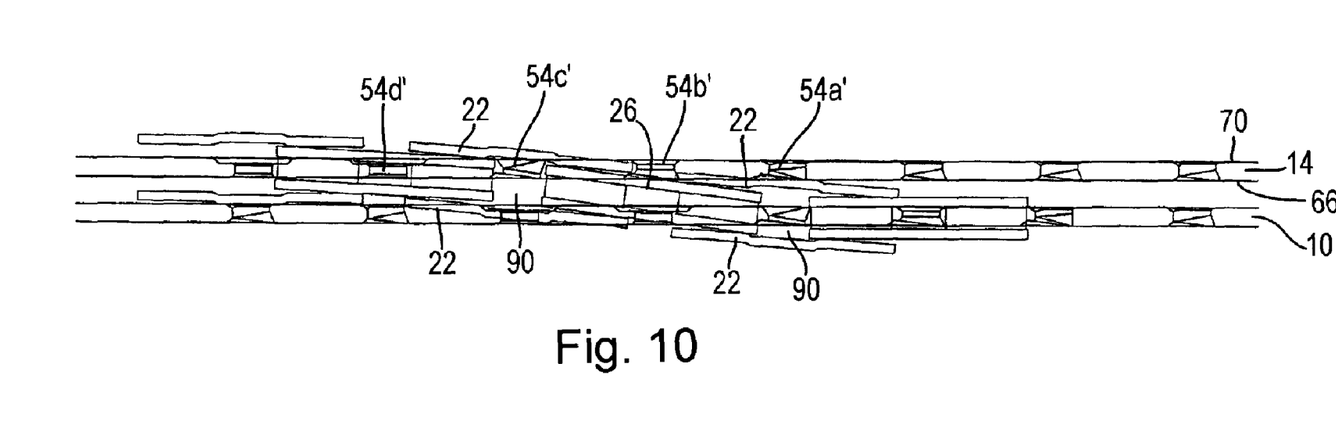
FIG. 10 is a top view illustrating shifting of a bicycle chain from the first sprocket to the second sprocket when a tooth is aligned with an outer link plate of a bicycle chain.

FIG. 10 is a top view illustrating shifting of chain 18 from smaller diameter sprocket 10 to larger diameter sprocket 14 when tooth 54a' is aligned with an outer link plate 22 of chain 18. In this case, tooth 54a', and particularly side surface 124, is dimensioned to engage a laterally outer surface of an outer link plate 22 of chain 18; first chain receiving tooth 54b', and particularly side surface 166, is dimensioned to engage a laterally outer surface of an inner link plate 26 of chain 18 immediately behind outer link plate 22 in the driving rotation direction X; and second chain receiving tooth 54c' is dimensioned to engage a space 90 between a pair of outer link plates 22 of chain 18 immediately behind inner link plate 26 in the driving rotation direction X, with recess 260 receiving the inner intermediate surface of inner link plate 26.

Figure 11:
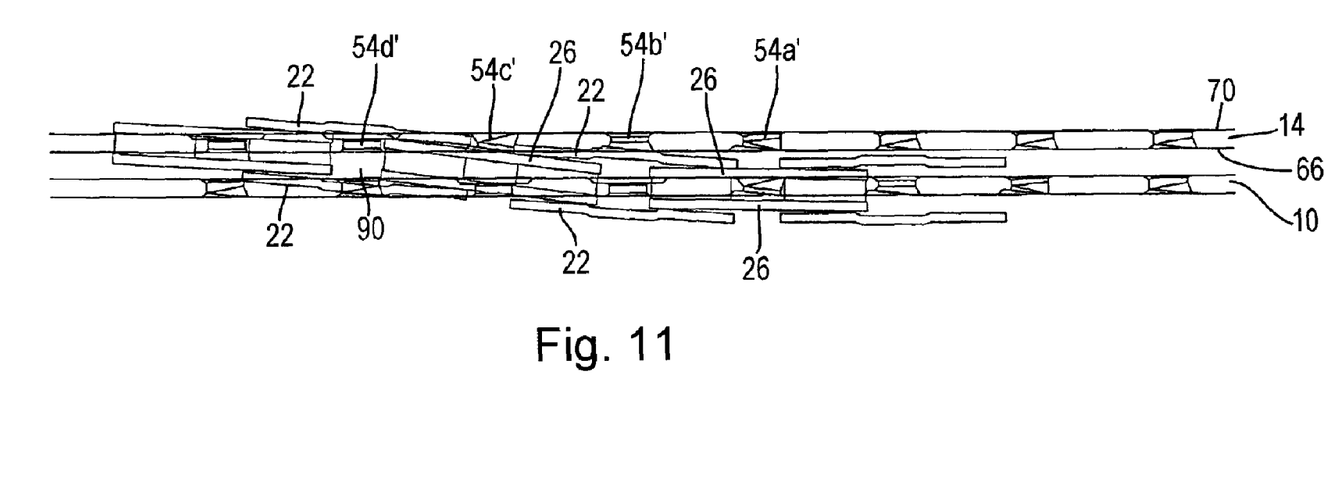
FIG. 11 is a top view illustrating shifting of a bicycle chain from the first sprocket to the second sprocket when the tooth is aligned with an inner link plate of the bicycle chain.

FIG. 11 is a top view illustrating shifting of chain 18 from smaller diameter sprocket 10 to larger diameter sprocket 14 when tooth 54a' is aligned with an inner link plate 26 of chain 18. As in the first embodiment, unlike prior art structures that are designed so that an outer link plate 22 of chain 18 is captured by first chain receiving tooth 54b', first chain receiving tooth 54b' is dimensioned to resist engagement with the space 90 between the pair of outer link plates 22. As a result, first chain receiving tooth 54b', and particularly surface 166, engages a laterally outer surface of an outer link plate 22 of chain 18; second chain receiving tooth 54c', and particularly surface 224, engages a laterally outer surface of an inner link plate 26 of chain 18 immediately behind outer link plate 22 in the driving rotation direction X, and third chain receiving tooth 54d' engages a space 90 between a pair of outer link plates 22 of chain 18 immediately behind inner link plate 22 in the driving rotation direction X, with recess 260 receiving the inner intermediate surface of outer link plate 22.

While the above is a description of various embodiments of inventive features, further modifications may be employed without departing from the spirit and scope of the present invention. For example, the size, shape, location or orientation of the various components may be changed as desired. Some such variations are disclosed in U.S. Pat. No. 4,889, 521. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle sprocket apparatus for use with a chain having pairs of inner link plates alternatingly connected to pairs of outer link plates through a roller assembly including a roller, wherein the apparatus comprises:

a larger diameter sprocket having on its outer periphery a plurality of sprocket teeth;

a smaller diameter sprocket having on its outer periphery a plurality of sprocket teeth;
wherein a number of sprocket teeth on the smaller diameter sprocket is less than a number of sprocket teeth on the larger diameter sprocket;
wherein the larger diameter sprocket includes;
a tooth;
a first chain receiving tooth disposed immediately behind the tooth in the driving rotation direction; and
a second chain receiving tooth disposed immediately behind the first chain receiving tooth in the driving rotation direction;
wherein the tooth includes:
a control side surface disposed on a leading side of the tooth facing the smaller diameter sprocket in the driving rotation direction, wherein the control side surface is shaped to inhibit movement of the chain towards the larger diameter sprocket so that, when the chain is shifted from the smaller diameter sprocket to the larger diameter sprocket, the first chain receiving tooth does not capture the chain and the second chain receiving tooth captures the chain; and
a first inclined side surface facing the smaller diameter sprocket, wherein the first inclined side surface is inclined relative to a plane of the sprocket to follow a direction of movement of the chain when the chain is shifted from the smaller diameter sprocket to the larger diameter sprocket.

2. The apparatus according to claim 1 wherein the larger diameter sprocket includes a lateral recess facing the smaller diameter sprocket, wherein at least a portion of the recess is disposed below the tooth at the tooth so as to face a link plate of the chain where the chain shifts from the smaller diameter sprocket to the larger diameter sprocket.

3. The apparatus according to claim 1 wherein the first chain receiving tooth includes a second inclined side surface facing the smaller diameter sprocket, the second inclined side surface being inclined relative to a plane of the sprocket to follow a direction of movement of the chain when the chain is shifted from the smaller diameter sprocket to the larger diameter sprocket.

4. A bicycle sprocket apparatus for use with a chain having pairs of inner link plates alternatingly connected to pairs of outer link plates through a roller assembly including a roller, wherein the apparatus comprises:
a larger diameter sprocket having on its outer periphery a plurality of sprocket teeth;
a smaller diameter sprocket having on its outer periphery a plurality of sprocket teeth;
wherein a number of sprocket teeth on the smaller diameter sprocket is less than a number of sprocket teeth on the larger diameter sprocket;
wherein the larger diameter sprocket includes a tooth and a first chain receiving tooth disposed immediately behind the tooth in the driving rotation direction;
wherein the tooth includes:
a control side surface disposed on a leading side of the tooth facing the smaller diameter sprocket in the driving rotation direction, wherein the control side surface is shaped to inhibit movement of the chain towards the larger diameter sprocket so that the first chain receiving tooth does not capture the chain when the chain is shifted from the smaller diameter sprocket to the larger diameter sprocket; and
a first inclined side surface facing the smaller diameter sprocket, wherein the first inclined side surface is inclined relative to a plane of the sprocket to follow a direction of movement of the chain when the chain is shifted from the smaller diameter sprocket to the larger diameter sprocket;
wherein the first chain receiving tooth includes a second inclined side surface facing the smaller diameter sprocket, the second inclined side surface being inclined relative to a plane of the sprocket to follow a direction of movement of the chain when the chain is shifted from the smaller diameter sprocket to the larger diameter sprocket;
wherein the larger diameter sprocket includes a lateral recess facing the smaller diameter sprocket, wherein at least a portion of the recess is disposed below the first chain receiving tooth at the first chain receiving tooth when viewed in the direction along the rotational axis of the larger diameter sprocket so as to face a link plate of the chain where the chain shifts from the smaller diameter sprocket to the larger diameter sprocket.

5. The apparatus according to claim 3 wherein the second chain receiving tooth includes a third inclined surface facing the smaller diameter sprocket, wherein the third inclined surface is inclined relative to a plane of the sprocket.

6. A bicycle sprocket apparatus for use with a chain having pairs of inner link plates alternatingly connected to pairs of outer link plates through a roller assembly including a roller, wherein the apparatus comprises:
a larger diameter sprocket having on its outer periphery a plurality of sprocket teeth;
a smaller diameter sprocket having on its outer periphery a plurality of sprocket teeth;
wherein a number of sprocket teeth on the smaller diameter sprocket is less than a number of sprocket teeth on the larger diameter sprocket;
wherein the larger diameter sprocket includes a tooth and a first chain receiving tooth disposed immediately behind the tooth in the driving rotation direction;
wherein the tooth includes:
a control side surface disposed on a leading side of the tooth facing the smaller diameter sprocket in the driving rotation direction, wherein the control side surface is shaped to inhibit movement of the chain towards the larger diameter sprocket so that the first chain receiving tooth does not capture the chain when the chain is shifted from the smaller diameter sprocket to the larger diameter sprocket; and
a first inclined side surface facing the smaller diameter sprocket, wherein the first inclined side surface is inclined relative to a plane of the sprocket to follow a direction of movement of the chain when the chain is shifted from the smaller diameter sprocket to the larger diameter sprocket;
wherein the first chain receiving tooth includes a second inclined side surface facing the smaller diameter sprocket, the second inclined side surface being inclined relative to a plane of the sprocket to follow a direction of movement of the chain when the chain is shifted from the smaller diameter sprocket to the larger diameter sprocket;
a second chain receiving tooth disposed immediately behind the first chain receiving tooth on the larger diameter sprocket in the driving rotation direction, wherein the second chain receiving tooth includes a third inclined surface facing the smaller diameter sprocket, and wherein the third inclined surface is inclined relative to a plane of the sprocket;
wherein the larger diameter sprocket includes a lateral recess facing the smaller diameter sprocket, wherein at least a portion of the recess is disposed below the second chain receiving tooth at the second chain receiving tooth when viewed in the direction along the rotational axis of the larger diameter sprocket so as to face a link plate of the chain where the chain shifts from the smaller diameter sprocket to the larger diameter sprocket.

7. The apparatus according to claim 1 wherein a third chain receiving tooth is disposed immediately behind the second chain receiving tooth on the larger diameter sprocket in the driving rotation direction, wherein the first chain receiving tooth is dimensioned to engage a laterally outer surface of an outer link plate of the chain so that the first chain receiving tooth does not capture the chain as the chain shifts from the smaller diameter sprocket to the larger diameter sprocket, wherein the second chain receiving tooth is dimensioned to engage a laterally outer surface of an inner link plate of the chain immediately behind the outer link plate in the driving rotation direction so that the second chain receiving tooth does not capture the chain, and wherein the third chain receiving tooth is dimensioned to engage a space between a pair of outer link plates of the chain immediately behind the inner link plate in the driving rotation direction.

8. The apparatus according to claim 1 wherein the tooth is dimensioned to engage a laterally outer surface of an outer link plate of the chain so that the tooth does not capture the chain as the chain shifts from the smaller diameter sprocket to the larger diameter sprocket, wherein the first chain receiving tooth is dimensioned to engage a laterally outer surface of an inner link plate of the chain immediately behind the outer link plate in the driving rotation direction so that the first chain receiving tooth does not capture the chain, and wherein the second chain receiving tooth is dimensioned to engage a space between a pair of outer link plates of the chain immediately behind the inner link plate in the driving rotation direction.

9. The apparatus according to claim 1 wherein a radial height of the first chain receiving tooth is greater than at least one other sprocket tooth on the larger diameter sprocket.

10. The apparatus according to claim 1 wherein the control side surface includes an area that extends radially coplanar with the side surface of the larger diameter sprocket.

11. The apparatus according to claim 10 wherein the entire control side surface is coplanar with the side surface of the larger diameter sprocket.

12. The apparatus according to claim 9 wherein a radial height of a radially outermost tip of the first chain receiving tooth is greater than a radial height of a radially outermost tip of at least one other sprocket tooth on the larger diameter sprocket.

\* \* \* \* \*